United States Patent Office 2,819,402
Patented Jan. 7, 1958

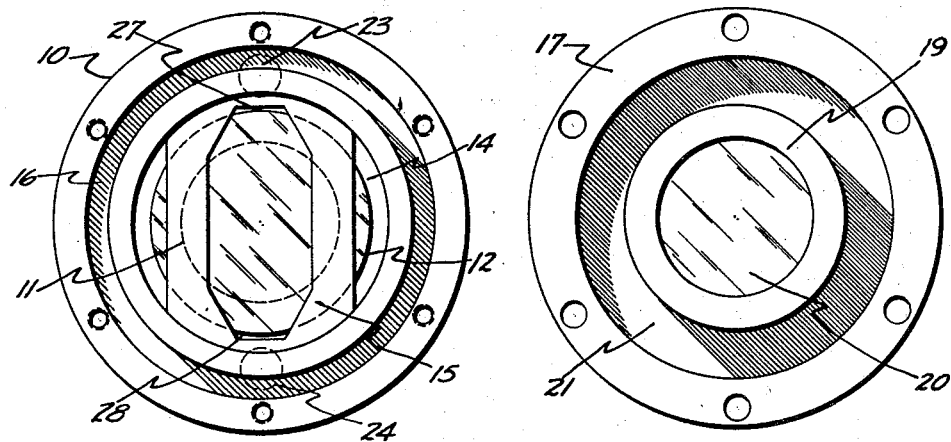
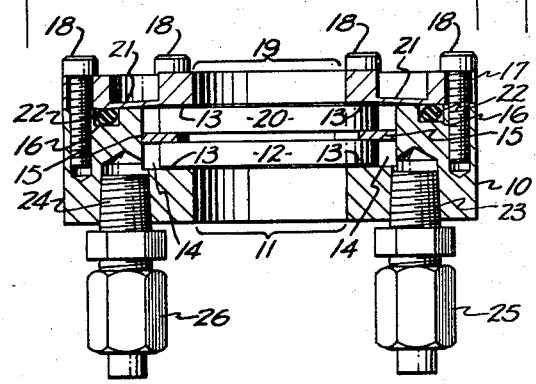
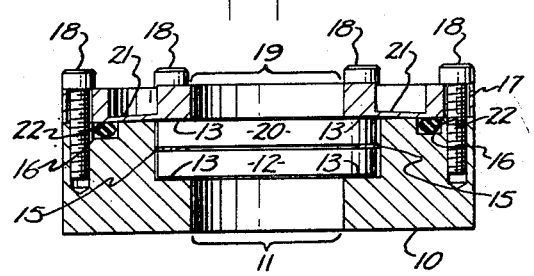
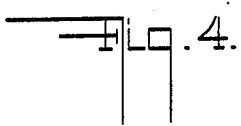
INVENTORS.
EMMETT S. WATSON
DONALD R. BRESKY
ABRAHAM SAVITZKY
ATTORNEY

2,819,402

RADIATION SAMPLE CELL

Emmett S. Watson, Ridgefield, Donald R. Bresky, Bridgeport, and Abraham Savitzky, Norwalk, Conn., assignors to The Perkin-Elmer Corporation, Norwalk, Conn., a corporation of New York Application November 28, 1955, Serial No. 549,242

11 Claims. (Cl. 250—43.5)

This invention relates to a device which is useful in apparatus for determining the radiation absorbed by a fluid and is concerned more particularly with a novel cell for introducing the fluid to be examined into a radiation path.

The new cell is conceived and constructed so that the sample thickness may be one of numerous selectable dimensions and it is superior to known cells designed to accomplish similar results in that the cell of the present invention is capable of holding a fluid sample under considerable pressure for indefinite periods of time with substantially no leakage.

Some prior art absorption cells have a sample region defined by a shim-type spacer wherein the spacer actually performs dual functions. Usually such a spacer has an open area at or near its center to effect the first of its functions, namely, that of separating two plates or windows which are transparent to the radiation used in the system to provide therebetween a space of known dimensions into which the sample may be introduced; the second function usually performed by such a spacer element is that of sealing the sample region and rendering it pressure-tight.

Sealing has been accomplished in conventional absorption cells used in infrared analysis instruments, for instance, by amalgamating a lead spacer or shim to optically polished rock salt windows. Alternatively, where the spacer ring or shim is to provide a thicker sample region, a brass spacer between thin lead gaskets amalgamated on both surfaces has been used to form a pressure-tight seal as in the thinner cell. An example of a typical prior art infrared absorption cell is disclosed in the article by Don C. Smith and Elmer E. Miller which appears at page 130 of the March 1944 issue of the Journal of the Optical Society of America.

Some of the problems connected with devising a satisfactory absorption cell are also mentioned in this publication. For example, amalgamating rock salt windows or plates to a common spacer to secure a pressure-tight sample region has some disadvantages which are particularly troublesome when it is desired to dismantle the cell, remove the amalgamated spacer, and replace it by a spacer of different thickness so as to alter the thickness of the sample region. Obviously, if a really good seal has been made by the amalgam, the window surface is likely to be damaged in removing the spacer. As a consequence, repair and repolishing of the window may be necessitated. It is also apparent that thin spacer rings will be rendered useless in the process of stripping them from the windows. The difficulties of disassembling such a cell for cleaning or purging purposes are manifest.

Moreover, such amalgam is usually formed of mercury coated on a spacer ring made of lead foil and, although the amalgam can be made to form a tight seal initially, there is a limit to the time during which such a seal will reliably hold a sample under pressure. When the fluid sample is comprised of a gas mixture, as in an infrared absorption analysis instrument of the dispersion type, for instance, it may be necessary to maintain a sample under uniform pressure for a considerable length of time in order to obtain a reliable analysis. Since infrared absorption will likely vary as a function of gas pressure, any variation in the gas sample pressure due to leakage, etc., will introduce an error into the analysis data. Liquid samples which are volatile may give rise to leakage from a conventional cell due to heat energy absorbed in the course of infrared analysis.

The problem of providing a suitable and reliable sample chamber for absorption analysis process control apparatus is further complicated by the fact that such instruments are customarily connected to a chemical process stream and must be capable of providing a pressure-tight sample chamber for indefinite periods of time, and not infrequently for relatively high pressures. Additionally, since the interwindow sample space must be quite thin if the sample is highly absorptive, it is often necessary to provide means for bypassing the constricted space between the windows so that the major portion of the process stream fluid drawn off for sampling purposes will continue to flow at the same rate as the process stream and thereby rapidly reflect any change in the process stream. Accordingly, only a relatively small amount of fluid is introduced into the interwindow sample space of the absorption cell. Nonetheless, the small amount of fluid which is irradiated for analysis purposes must vary and change substantially with the rapidity of the by-passed portion of the sample stream in order to avoid undue time lag between the composition of the actual process stream and analysis data.

The principal object of the present invention is therefore to overcome the shortcomings and more troublesome aspects of known sample cells of the character used in absorption analysis systems.

In accordance with the present invention, the two principal functions of the novel cell, i. e., that of (1) providing a radiation transparent sample region of uniform and known thickness, and (2) providing a pressure-tight sample region for indefinite periods of time, are accomplished by separate elements of the new cell assembly rather than by the same amalgamated spacer element as was common in the prior art. Additionally, the present invention may be readily embodied in a cell which incorporates by-pass means particularly suited to use in process stream analysis instruments. These and other features and advantages of the present invention will be understood more readily from the description of several embodiments of the present invention which follow when taken together with the accompanying drawings, in which, Fig. 1 is a top view of the main body member of the present invention;

Fig. 2 is a top view of the cover plate member of the present invention;

Fig. 3 is a sectional view of an absorption cell assembly embodying the present invention;

Fig. 4 is a sectional view of another embodiment of the present invention;

Figure 5:
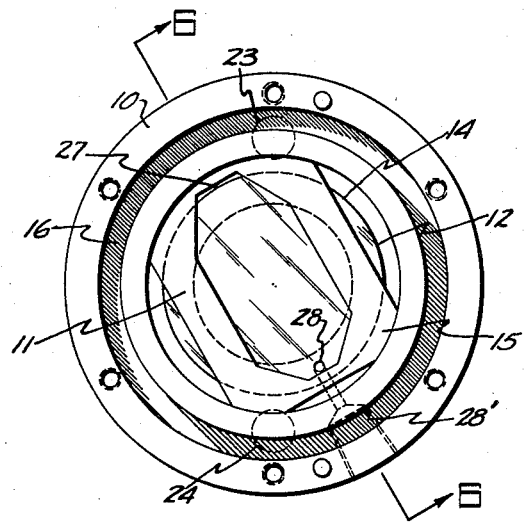
Fig. 5 is a top view of another embodiment of the present invention.

A typical embodiment of the present invention is comprised of two principal parts which are a main body member and a cover plate of matching size and shape. As illustrated in Fig. 1, the main body member 10 may be generally cylindrical in shape and provided with a concentric aperture, as shown at 11. The aperture 11 has affixed thereto a window 12 of material which will transmit the radiation employed in the system wherein the cell is to be utilized. The window 12 may be cemented to the main body member 10 by one of several commercially available cements which are virtually impervious to most corrosive effects. A gasket 13 of lead or similar material is preferably used between the cemented surfaces to relieve stresses which may develop from differences in thermal expansion between the window material and the main body cell material. Alternatively, an O ring or other type of gasket sealing means may be used to seal the windows.

The main body member 10 may have an annular space 14 about the circumference of the window 12. A shim-type spacer 15 is shaped so as to fit over the window 12 and within the annular space 14. The spacer 15 may be made of stainless steel or other durable non-corrosive material and has an aperture at or near its center to permit passage of radiation. As will be seen from the description of the complete cell assembly, the thickness of the spacer 15 substantially determines the thickness of the sample region into which the sample is introduced to be analyzed by irradiation. The spacer 15 is of uniform thickness throughout and therefore ensures parallelism of the interwindow space as illustrated in Fig. 3. As shown in Figs. 1 and 3, the main body member 10 is seen to have an outer annular recess 16 enclosing the entire sample region.

Fig. 2 is a top view of a matching cover plate 17 which fits over the main body member 10 and may be secured thereto by a plurality of cap screws 18 shown in Fig. 3. The circular cover plate 17 has an aperture 19 which is concentric and therefore aligns with the aperture 11 of the main body member 10 when the cell is assembled for use. Affixed to the aperture of the cover plate 17 is a radiation transparent window 20 similar to that affixed to the aperture of the main body member. The cover plate 17 has an annular recess 21 about its window area which provides a thin wall section as best seen in the sectional view of Fig. 3. The thin wall section at the bottom of the recess 21 is elastically flexible within small limits dependent upon the type of material used for the cover plate. Accordingly, the central window area of the cover plate 17 is yieldingly displaced without permanent deformation when sufficient pressure is brought to bear upon the cover plate window 20. The elastic deformation of the cover plate 17 may be readily seen in the sectional view of the assembled cell illustrated in Fig. 3.

The thickness of the spacer 15 determines the interwindow space wherein the sample to be irradiated is introduced for analysis purposes. The spacer 15 is of uniform thickness and therefore maintains the window surfaces in parallel relationship, bearing upon both window surfaces 12 and 20 of the assembly. The window 12 affixed to the main body member 10, however, is rigidly supported, while the window 20 of the cover plate 17 is affixed to an inner annular region of the cover plate 17 which is elastically flexible with respect to the outer periphery of the cover plate. This is due to the thin wall section as shown at 21 and previously described. Thus, when the plurality of cap screws 18 as shown in Fig. 3 are tightened to draw the outer periphery of the cover plate 17 and the main body member 10 together, the window region of the cover plate 17 is flexibly displaced by an amount sufficient to preserve the interwindow sample space as determined by the thickness of the spacer 15.

An O-ring 22 or other resilient sealing means is positioned in the annular recess 16 adjacent the outer periphery of the assembly and when the cover plate 17 and the main body member 10 of the cell are drawn into contact by the plurality of cap screws 18, the O-ring 22 is compressed by contact with both the cover plate 17 and the main body member 10, forming a tight seal therebetween. The outer sealing means 16 therefore forms a pressure-tight seal completely enclosing the entire sample region of the cell assembly, including the irradiated sample space between the windows and the annular by-pass about the windows as well.

In accordance with the teaching of the present invention, the pressure-tight seal about the entire sample region is maintained by an element of the cell assembly which is separate and distinct from that which determines a uniform interwindow sample space in the cell. This is in contrast to many prior art cells wherein the sealing and interwindow spacing functions were performed by a single element, i. e., a spacer amalgamated to both window surfaces. The cell of the present invention may therefore be readily disassembled and thoroughly cleaned, there being no inaccessible spaces where samples or other fluids are likely to be inadvertently retained in the cell. This is of prime importance because traces of samples, however minute, if allowed to remain in the cell assembly, may be a source of error in subsequent analyses in which the cell is used.

As shown in Fig. 3, an annular space 14 is provided in the main body member 10 about the radiation transparent window 12. Internal passages 23 and 24 spaced at diametrically opposed points of the main body member 10 connect with the sample area. The passages 23 and 24 may be tapped and connected with sample inlet and outlet means provided with appropriate couplings 25 and 26 as shown in Fig. 3 which are connectable with a continuously flowing sample.

The interwindow spacer 15 has an aperture therein generally defining the interwindow sample area, and the spacer aperture is so dimensioned and arranged that it overlaps a small portion of the annular space 14 about the windows through which the continuously flowing sample passes. When the spacer 15 is positioned as shown in Fig. 1, and the cell assembled as shown in Fig. 3, sample fluid entering the cell through the sample inlet 26 will flow partially into the irradiated interwindow sample region and partially through the annular by-pass region 14 about the periphery of the windows 20 and 12. The irradiated sample flows out from the interwindow space adjacent the sample outlet at 28.

The particular embodiment illustrated in Figs. 1, 2 and 3 may be employed in a system which irradiates a portion of a continuously flowing sample for analysis purposes. Because of variation in absorptive characteristics and other factors, different fluid samples may require interwindow sample spaces of different thicknesses. Typical interwindow spacing may range from a fraction of a thousandth of an inch to the order of eighty thousandths of an inch or more. It will be noted that the embodiment illustrated by Figs. 1, 2 and 3 employs a relatively thick spacer and the cell shown is therefore suitable for use with samples which permit a relatively large interwindow sample space. Under these conditions, the constriction between the windows is not severe and the flow of the irradiated sample through the interwindow space will be substantially consistent with that of the sample by-passed in the annular space about the windows.

The present invention is not, however, confined to use with a continuously flowing process sample as in a process stream analysis or control instrument, but may be employed to advantage in instruments wherein discrete samples are placed in the absorption cell for individual and separate analyses.

The embodiment of the present invention illustrated by Fig. 4 is suitable for use in absorption analysis systems where it is desired to investigate discrete samples. In Fig. 4 comparable elements bear the same numerical designation as the embodiment of Figs. 1, 2 and 3. The construction of the cell is substantially the same as that of the embodiment of Figs. 1, 2 and 3 with the exceptions that little or no annular space about the windows is provided, and there are no internal passages in the main body member 10. It should be noted, however, that features of the present invention are employed in substantially the same manner as in the previously described embodiment; the cover plate 17 is flexibly displaced; the uniform interwindow space is determined by the spacer 15; and the sealing of the entire sample region is accomplished by sealing means 22 independently of the spacer.

In the embodiment of Fig. 4, the interwindow spacer 15 may comprise a uniformly thick annular ring of stainless steel or other non-corrosive material fitted about the periphery of the windows 12 and 20. Since each sample is individually introduced into the irradiated sample region, there is no necessity for the aperture of the spacer to extend beyond the interwindow space. Accordingly, the spacer 15 of the discrete sample absorption cell of Fig. 4 is preferably of simple annular configuration.

It will be recalled that in order to analyze some types of samples by the observation of radiation absorption, it is necessary to have a very small interwindow sample space which may be of the order of less than one thousandth of an inch. Such a narrowly restricted interwindow sample space does not pose any particular problem if discrete samples are to be analyzed in a cell of the type illustrated in Fig. 4. If, however, the sample to be analyzed is a continuously flowing sample tapped from a process stream, the constriction of an extremely small interwindow separation will likely prevent the irradiated sample within the interwindow sample space from changing with the same rapidity as the major portion of the sample which is by-passed in the annular space about the windows. In other words during ordinary process stream analysis, an extremely small interwindow space will tend to resist the flow of sample therebetween so that a considerable time lag may exist between the irradiated sample undergoing analysis in the interwindow sample space and the sample flowing in the main process stream or about the annular by-pass region of the cell. Consequently, a change in the consistency of the fluid in the main process stream will not be detected by the system immediately, but will be delayed for a period depending principally upon the time lag mentioned.

Figure 6:
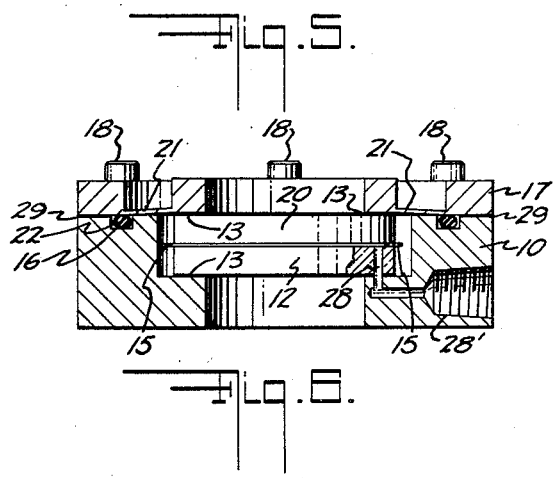
Fig. 6 is a sectional view through line 6—6 of Fig. 5.

The embodiment of the present invention illustrated in Figs. 5 and 6 is adapted to overcome this difficulty. The top view of this embodiment as shown in Fig. 5 illustrates a sample inlet 23 and outlet 24 similar to those illustrated in Fig. 3 and the main body element 10 is constructed substantially the same as that of Fig. 3. It will be noted, however, that the spacer 15 shown in Fig. 5 has a somewhat different configuration than that shown in Fig. 3. Its aperture is so designed and dimensioned as to only overlap the annular by-pass space 14 adjacent the sample inlet 23 so that some of the sample will flow to the irradiated interwindow sample space.

The opposite end of the aperture in the spacer 15, however, does not overlap the annular by-pass region 14 about the windows. The embodiment of Fig. 5 includes an additional small internal passage 28 through the window 12 and the main body member 10. The internal passage 28 connects with a passage 28' through the wall of the main body member, which is tapped and adapted to receive a pipe or similar connection. The manner in which the internal passages 28 and 28' connect the interwindow sample space of the cell with its outside is illustrated in Fig. 6.

Figure 7:
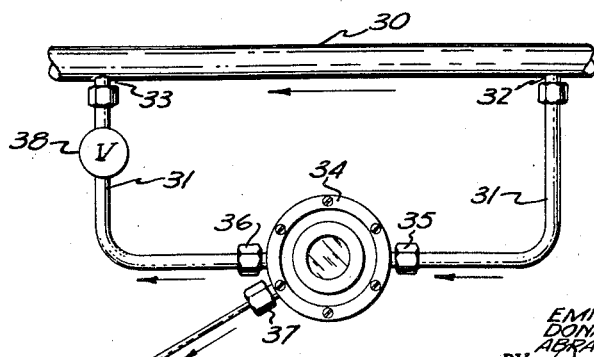
Fig. 7 is a schematic illustration of the manner in which the present invention may be connected and employed in a continuously flowing process stream.

It is to be noted that the passages 28 and 28' have no connection with the sample inlet and outlet passages 23 and 24. The manner in which the third internal connection through passages 28 and 28' is utilized in order to ensure sample flow within the interwindow space consistent with the sample flow of the by-passed portion of the sample, is shown in Fig. 7. Assuming that it is desired to continuously analyze a fluid flowing through a passage 30 as indicated by the arrows, a sample tap line 31 may be connected into the process stream flow at 32 and returned to the process stream at 33. Sample thus drawn from the main process stream 30 is admitted to a sample cell 34 through sample cell inlet connection 35 through inlet passage 23 within the cell, and then passes through the cell 34 to return to the sample tap line 31 through outlet passage 24 and the sample cell outlet connection 36.

Within the sample cell 34, the major portion of the continuously flowing sample actually by-passes the interwindow irradiated sample space by flowing through the internal annular by-pass as previously described in the embodiments of Figs. 1, 2, 3, 5 and 6. The sample cell of Figs. 5 and 6, however, when employed as schematically illustrated in Fig. 7, has an additional passage which connects the irradiated interwindow sample space with the outside of the cell. In virtually every instance where a sample is tapped from a process stream as illustrated in Fig. 7, some pressure will exist at the outlet connection 36 of the sample cell 34, as well as at the inlet connection 35 and the annular by-pass within the cell connecting inlet and outlet passages 23 and 24. If, therefore, the passages 28 and 28' at the outlet side of the interwindow sample space are connected to a discharge 37 having a lesser pressure such as atmospheric pressure, for instance, a favorable pressure drop will exist across the interwindow sample space from the point where the sample to be irradiated enters the interwindow space at 27 to the sample space discharge passage 28 as compared to that across the annular by-pass from inlet 23 to outlet 24, or from 27 to outlet 24 within the cell. Due to the favorable pressure drop existing across the irradiated sample space, adequate sample flow is drawn through the small interwindow separation for irradiation and analysis despite its narrow constriction and the existence of the larger by-pass about the interwindow space which offers less resistance to flow.

Moreover, the amount of such sample flow through the irradiated interwindow space of the cell may be regulated by an adjustable valve 38 appropriately connected in the section of the sample tap line 31 which returns the sample to the main process stream 30. Thus, a valve such as 38 illustrated in Fig. 7 can be adjusted to regulate the differential in pressure drop across the cell interwindow space as compared to the pressure drop across the main sample inlet 35 and outlet 36 of the sample cell. Since in the embodiment of Figs. 5 and 6 the interwindow space is extremely small, the amount of sample which passes therebetween is negligible in most instances. Frequently, it has been found that this very small amount of sample is so inconsequential that it can be disposed of as waste.

It will be noted that the embodiment of Fig. 6 shows a thin peripheral shim 29 between the cover plate 17 and the main body member 10. A number of such shims or a single shim of greater thickness may be used to vary the peripheral spacing between the cover plate 17 and the main body member 10 so as not to exceed the elastic limit of the thin wall section 21 of the cover plate 17 when thicker spacers 15 are employed to enlarge the interwindow sample region. The thin wall section 21 will therefore return to its original shape and alignment.

The present invention also contemplates that the thin wall section 21 of the cover plate may be designed to have a yield point that is less than the compressive stress that will cause the windows to fracture. Accordingly, when thicker interwindow spacers are used, the cover plate will be yieldingly deformed, but its elastic resiliency will be substantially unchanged within small limits beyond the permanent deformation. Such elastic resiliency has a spring-like effect, exerting a determinable maximum pressure upon the windows regardless of the increased thickness of the interwindow spacer. Once having been so deformed, the thin wall section of a cover plate may be restored to any desired alignment by cold pressing in an arbor press, for instance, and thus be usable for the smallest of interwindow spaces exerting the same determinable maximum pressure in accordance with its elasticity and pre-calculated yield point as taught by the present invention. The particular design of each such cover plate depends, of course, upon the physical properties of the materials used in it and the windows.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

We claim:

1. An absorption cell assembly comprising a main body member and a matching cover plate, each having a radiation-transparent window aligned with an aperture therein, said cover plate including a flexible annular portion, a spacer positioned between said windows, resilient sealing means positioned between said body member and cover plate outside its flexible portion, and means for drawing the periphery of said assembly into contact under uniform pressure, whereby the flexible portion of said cover plate is elastically deformed to preserve the space between said windows in accordance with the thickness of said spacer.

2. An absorption cell assembly in accordance with claim 1 wherein said sealing means comprises a compressible O-ring.

3. An absorption cell assembly in accordance with claim 1, wherein said spacer is adapted to admit fluid between said windows, and said main body member includes a passage connecting with said interwindow space.

4. An absorption cell assembly in accordance with claim 1 wherein said main body member includes a by-pass passage about said interwindow space.

5. An absorption cell assembly in accordance with claim 1 wherein said spacer is adapted to admit fluid between said windows, and said main body member includes a by-pass passage about said interwindow space connecting with inlet and outlet passages for continuous sample flow therethrough.

6. An absorption cell assembly in accordance with claim 1 including an annular shim positioned between the peripheral surfaces of said main body member and said cover plate whereby to accommodate spacers of increased thickness for enlarging the interwindow space.

7. An absorption cell assembly in accordance with claim 1 wherein said spacer comprises a flat section of stainless steel of uniform thickness having an opening therein to permit the passage of radiation.

8. An absorption cell assembly comprising a circular main body member and matching cover plate of corrosion-resistant material, each having a radiation-transparent window aligned with a concentric aperture, said cover plate including a flexible annular portion adjacent its window, a spacer of uniform thickness positioned between said windows, said spacer having an aperture therein to admit fluid sample to said interwindow space, an annular by-pass recess about the window of said main body member, inlet and outlet passages for admitting fluid sample to said by-pass region, a resilient O-ring positioned between said body member and cover plate outside its flexible portion, and a plurality of uniformly spaced screw means arranged about the periphery of said assembly for drawing said assembly into sealed contact.

9. An absorption cell assembly comprising a circular main body member and matching cover plate of stainless steel, each having a radiation-transparent window cemented to a concentric aperture, said cover plate including a flexible annular portion adjacent its window, a spacer of uniform thickness positioned between said windows, said spacer having an aperture therein shaped to admit fluid sample to said interwindow space, an annular by-pass recess about the window of said main body member, inlet and outlet passages for admitting fluid sample to said by-pass region, and a plurality of uniformly spaced screw means arranged about the periphery of said assembly for drawing said assembly into sealed contact.

10. An absorption cell assembly comprising a main body member and matching cover plate of corrosion-resistant material, each having a radiation-transparent window aligned with an aperture, said cover plate including a flexible annular portion adjacent its window and said body member having an annular by-pass recess adjacent its window connecting with inlet and outlet passages for flowing fluid sample therethrough, a spacer of uniform thickness positioned between said windows, said spacer having an aperture therein which overlaps said by-pass adjacent said inlet passage, a tertiary passage connecting with said interwindow space for discharging irradiated sample flow to a pressure less than that of said outlet passage, compressible sealing means positioned between said main body member and said cover plate outside its flexible portion, and a plurality of uniformly spaced screw means spaced about the periphery of said assembly for drawing said assembly into sealed contact.

11. An absorption cell assembly comprising a circular main body member and matching cover plate of corrosion-resistant material, each having a radiation-transparent window affixed over a concentric aperture, said cover plate including a flexible annular portion adjacent its window and said body member having an annular by-pass recess adjacent its window connecting with inlet and outlet passages for flowing fluid sample therethrough, a spacer of uniform thickness positioned between said windows, said spacer having an aperture therein which overlaps said by-pass adjacent said inlet passage, a tertiary passage through said main body and its window connecting with said spacer aperture for discharging irradiated sample flow to a pressure less than that of said outlet passage, compressible sealing means positioned between said body member and said cover plate outside its flexible portion, and a plurality of uniformly spaced screw means arranged about the periphery of said assembly for drawing said assembly into sealed contact.

References Cited in the file of this patent

UNITED STATES PATENTS

| | | |
|---|---|---|
| 2,048,128 | Logan | July 21, 1936 |
| 2,690,695 | Coates | Oct. 5, 1954 |
| 2,700,320 | Malmros | Jan. 25, 1955 |